US006968216B1

(12) United States Patent
Chen et al.

(10) Patent No.: US 6,968,216 B1
(45) Date of Patent: Nov. 22, 2005

(54) METHOD AND APPARATUS FOR CONTROLLING RINGER CHARACTERISTICS FOR WIRELESS COMMUNICATION DEVICES

(75) Inventors: David Chen, San Carlos, CA (US); Jared Oberhaus, Palo Alto, CA (US)

(73) Assignee: Openwave Systems Inc., Redwood City, CA (US)

(*) Notice: Subject to any disclaimer, the term of this patent is extended or adjusted under 35 U.S.C. 154(b) by 729 days.

(21) Appl. No.: 09/919,762

(22) Filed: Jul. 31, 2001

Related U.S. Application Data

(60) Provisional application No. 60/295,385, filed on May 31, 2001.

(51) Int. Cl.[7] .................................................. H04B 1/00
(52) U.S. Cl. ...................................... 455/567; 455/566
(58) Field of Search ................................ 455/567, 566, 455/563, 550.1, 417, 415, 421

(56) References Cited

U.S. PATENT DOCUMENTS

| | | | |
|---|---|---|---|
| 5,845,300 A | 12/1998 | Comer et al. | |
| 6,208,339 B1 | 3/2001 | Atlas et al. | |
| 6,418,309 B1 * | 7/2002 | Moon et al. | 455/418 |
| 6,463,278 B2 * | 10/2002 | Kraft et al. | 455/418 |
| 6,467,026 B2 | 10/2002 | Yamamoto et al. | |
| 6,496,931 B1 | 12/2002 | Rajchel et al. | |
| 6,574,471 B1 * | 6/2003 | Rydbeck | 455/418 |
| 2001/0049275 A1 * | 12/2001 | Pierry et al. | 455/414 |

FOREIGN PATENT DOCUMENTS

WO   WO 02/27552 A2   4/2002

OTHER PUBLICATIONS

Kristol & Montulli, "HTTP State Management Mechanism," Network Working Group, Standards Group, Request for Comments: 2965, Oct. 2000.
Masinter, "Returning Values from Forms: multipart/form-data," Network Working Group, Standards Group, Request for Comments: 2388, Aug. 1998.
W3C, "The Platform for Privacy Preferences 1.0, (P3P1.0) Specification," Working Draft, May 10, 2000.
W3C, "Platform for Privacy Preferences 1.0, (P3P1.0) Syntax Specification," Working Draft, Nov. 9, 1998.
W3C, P3P 1.0: A New Standard in Online Privacy, P3P Public Overview, downloaded from http://www.w3.org/P3P/brochure.html.
Cookiecentral.com, "The Cookie Concept," downloaded from http://www.cookiecentral.com/content.phtml?area=2&id=1.
Microsoft Word 2000, Help Screens for AutoComplete and AutoText, Microsoft Corp., 1999.

* cited by examiner

*Primary Examiner*—Nick Corsaro
(74) *Attorney, Agent, or Firm*—Beyer Weaver & Thomas, LLP

(57) ABSTRACT

Improved techniques for controlling notification characteristics for wireless communication devices are disclosed. One aspect of the improved techniques pertains to timer-based notification control for wireless communication devices. Another aspect of the improved techniques pertains to calendar-based notification control for wireless communication devices. Still another aspect of the invention pertains to graphical user interfaces that can be utilized to set or monitor notification characteristics for wireless communication devices. The improved techniques are particularly suitable for use with wireless communication devices having constrained keypads and wireless browsers that display documents (e.g., such as markup language documents) or messages to users of the wireless communication devices.

19 Claims, 7 Drawing Sheets

US 6,968,216 B1

METHOD AND APPARATUS FOR CONTROLLING RINGER CHARACTERISTICS FOR WIRELESS COMMUNICATION DEVICES

CROSS-REFERENCE TO RELATED APPLICATION

This application claims priority to U.S. Provisional Patent Application No. 60/295,385 filed on May 31, 2001, which is hereby incorporated herein by reference in its entirety.

BACKGROUND OF THE INVENTION

1. Field of the Invention

The invention relates to wireless communication devices and, more particularly, to ringer control for wireless communication devices.

2. Description of the Related Art

With recent advances in technology, mobile phones are able to be "active" continuously for periods of a week or more without recharging the phone's rechargeable battery. When mobile phones are active, they are able to receive incoming calls. Mobile phones include ringers that notify the user when a call is presently incoming.

Conventionally, mobile phones permit users to manually change the ringer-mode, such as to a vibrate-mode or a mute-mode, instead of a ring-mode. Hence, when the user of a mobile phone decides that they do not want to be disturbed, they are able to manually interact with the mobile phone to switch the ringer to either the vibrate-mode or the mute-mode. More recently, at least one mobile phone manufacturer has provided their mobile phones with a feature that allows users to define "profiles" for different situations, such that specific ringer tunes, modes or volumes can be used for specific situations. For example, the "profiles" might include normal, silent, meeting and outdoors. Hence, the user is able to interact with the mobile device to select a profile and thus manually switch to a particular profile and thus control the ringer mode. Hence, in situations in which users of mobile devices do not want to be interrupted or disturbed (such as while sleeping, during meetings or meal times), the user can interact with the mobile device to turn the ringer off or to switch the ringer to a vibrate mode.

Unfortunately, however, one disadvantage to conventional approaches towards manual ringer control is that users have to manually deactivate and reactivate the ringer. Often, however, a user forgets to later reactivate the ringer after the situation during which they did not want to be disturbed or interrupted has passed. In other words, with the busy and hectic schedules of users, users often forget to reset their device after a meeting or other situation that required the ringer to be deactivated. However, when the mobile device is thereafter left deactivated, the user may miss an important incoming call even though the call arrived after the event during which the ringer was to be deactivated.

Thus, there is a need for improved approaches to enable greater control over ringers of wireless communication devices.

SUMMARY OF THE INVENTION

Broadly speaking, the invention relates to improved approaches to controlling notification characteristics for wireless communication devices. One aspect of the invention pertains to timer-based notification control for wireless communication devices. Another aspect of the invention pertains to calendar-based notification control for wireless communication devices. The invention is particularly suitable for use with wireless communication devices having constrained keypads and wireless browsers that display documents (e.g., such as markup language documents) or messages to users of the wireless communication devices. Still another aspect of the invention pertains to graphical user interfaces that can be utilized to set or monitor notification characteristics for wireless communication devices.

The invention can be implemented in numerous ways, including as a method, system, device, graphical user interface, and a computer readable medium. Several embodiments of the invention are discussed below.

As a computer-implemented method for automatically switching notification characteristics for a mobile communication device, one embodiment of the invention includes the operations of: obtaining a time indication from the mobile communication device; determining whether at least one of the notification characteristics for the mobile communication device are to be modified based on the time indication; and modifying the at least one of the notification characteristics when the determining determines that at least one of the notification characteristics are to be modified based on the time indication.

As a computer-implemented method for automatically controlling notification characteristics for a mobile communication device based on events produced by a calendar application, another embodiment of the invention includes at least the operations of: obtaining a date and time indication; determining, from the calendar application, whether an event is starting or ending at the time of the date and time indication; and modifying at least one of the notification characteristics for the mobile communication device based on notification criteria associated with the event when the determining determines that the event is starting or ending.

As a graphical user interface for use with a mobile communication device to set or view notification characteristics for a ringer device of the mobile communication device, one embodiment of the invention includes at least: a notification setting display screen that enables a user to set the notification characteristics to a certain setting for a predetermined duration; and a notification status display screen that enables a user to view current notification characteristics for the mobile communication device.

As a graphical user interface for use with a mobile communication device to set or view notification characteristics for a ringer device of the mobile communication device, another embodiment of the invention includes at least: an event notification setting display screen that enables a user to set notification characteristics for the ringer device that are utilized during an event associated therewith; and a notification status display screen that enables a user to view current notification characteristics for the mobile communication device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved approaches to controlling notification characteristics for wireless communication devices. One aspect of the invention pertains to timer-based notification control for wireless communication devices. Another aspect of the invention pertains to calendar-based notification control for wireless communication devices. Still another aspect of the invention pertains to graphical user interfaces that can be utilized to set or monitor notification characteristics for wireless communication devices.

Typically, notifications to a user of a wireless communication device are performed by a ringer incorporated within the wireless communication device. These ringers can have different ringer modes and/or volume settings. The notification control provided by the invention can thus facilitate altering of notification characteristics, namely, ringer characteristics, such as ringer mode (e.g., on, mute or vibrate) and/or volume settings.

The invention is particularly suitable for use with wireless communication devices having constrained keypads and/or wireless browsers that display documents (e.g., such as markup language documents) or messages to users of the wireless communication devices. Examples of such wireless communication devices include mobile telephones, pagers, Personal Digital Assistants (PDAs), or small-scale Internet appliances.

Embodiments of the invention are discussed below with reference to FIGS. 1–6B. However, those skilled in the art will readily appreciate that the detailed description given herein with respect to these figures is for explanatory purposes as the invention extends beyond these limited embodiments.

Figure 1:
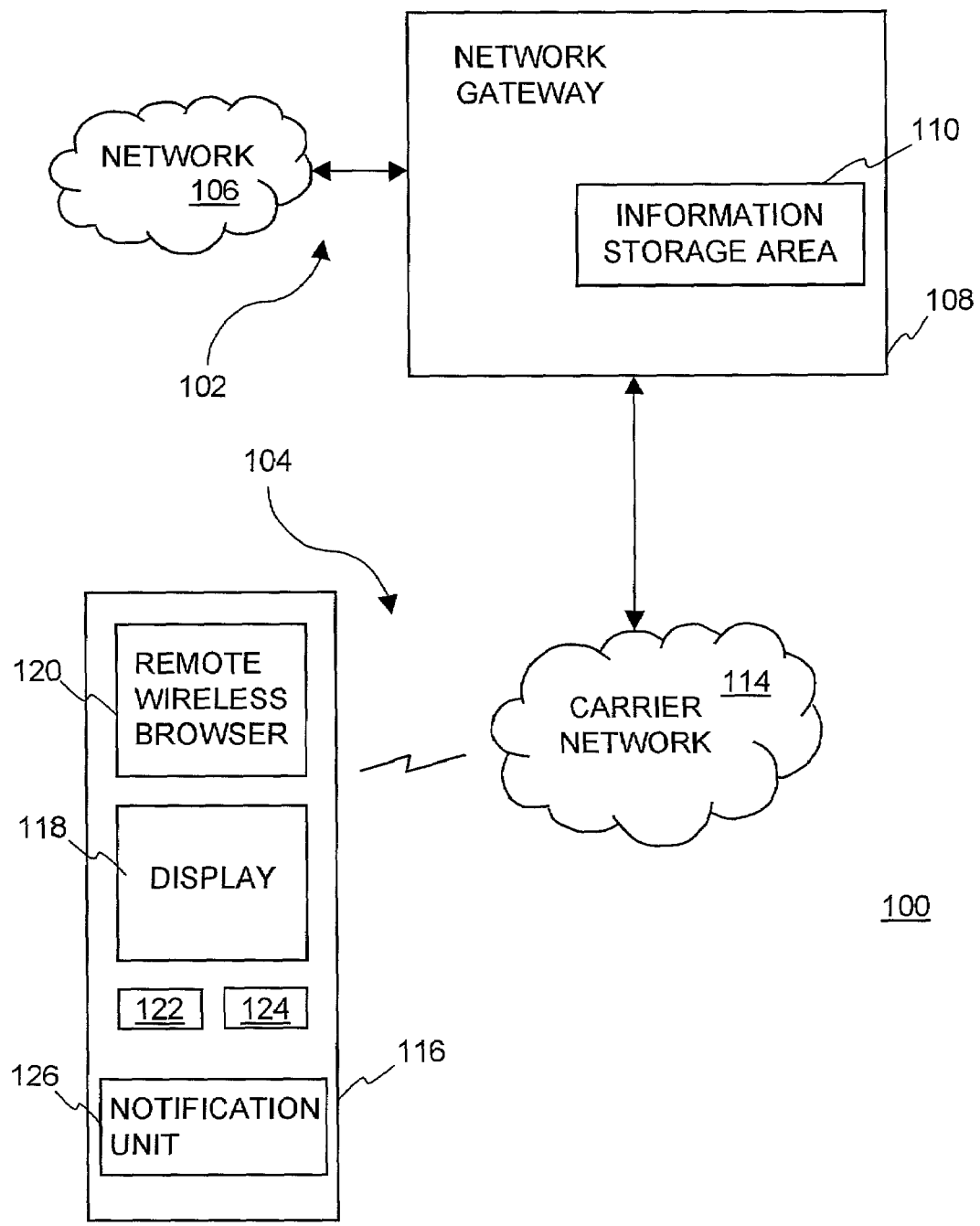
FIG. 1 is a block diagram of a communication system according to one embodiment of the invention.

FIG. 1 is a block diagram of a communication system 100 according to one embodiment of the invention. The communication system 100 includes a wired section 102 and a wireless section 104. The wired section 102 includes a network 106 and a network gateway 108. In one embodiment, the network 106 is the Internet, which represents a large number of interconnected computers. In another embodiment, the network 106 is an intranet or private network of computers.

The network gateway 108 operates to provide a gateway (link server or proxy server) between the wired section 102 and the wireless section 104. The network gateway 108 will normally perform some protocol translation and other account management and verification operations. The network gateway 108 includes an information storage area 110 that stores account, configuration and other information.

The wireless section 104 includes a carrier network 114 and at least one remote wireless computing device 116. The remote computing device 116 can, for example, be a mobile telephone, a Personal Digital Assistant (PDA), or Internet appliance. Typically, the remote computing device 116 can receive data (from the network 106) over the carrier network 114. The data can, for example, pertain to electronic mail messages, web pages, or documents. Further, when the remote computing device 116 supports voice calls, such voice calls can be received over the carrier network 114.

The remote wireless computing device 116 includes a display 118 for displaying screens or pages of information, a remote wireless browser 120, and navigation buttons 122 and 124. The remote wireless browser 120 is usually an application program that executes on the remote wireless computing device 116. The remote wireless browser 120 is used to access and display the screens or pages of information to be displayed on the display 118. The screens or pages displayed by the network browser can be, or include, documents, graphics or forms. A particular screen or page may only display a portion of a document, graphic or form. Forms solicit data entry from users. Forms, like other pages, can be in a markup language format or can take some other format type (e.g., pdf. Markup languages include, for example, HTML, HDML or WML. The navigation buttons 122 and 124 allow a user to navigate through, or make selections from, menus or lists being displayed on the display 118 by the enhanced remote wireless browser 120. The remote wireless computing device 116 (e.g., mobile telephone) can also include an alphanumeric keypad (not shown) that allows a user to enter alphanumeric information with respect to the remote wireless computing device 116. Such a keypad is not necessary, as alphanumeric information can also be entered, for example, using voice-activation or using a dial screen displayed on the display 118 with selections being made using the navigation buttons 122 and 124. By interacting with the enhanced remote wireless browser 120, a user is able to access information located on the network 106.

The remote wireless computing device 116 also includes a notification unit 126. The notification unit 126 controls a notification device (e.g., ringer) within the remote wireless computing device 116 to notify its user of incoming calls or data (e.g., electronic mail). The notification unit 126 is user-accessible (via user interaction with the remote wireless computing device 116) so that the user of the wireless computing device is able to set or view notification characteristics for the notification device. The notification unit 126 is also intelligent enough to automatically set notification characteristics for the notification device. As examples, the automatic setting of notification characteristics can be timer-based or event based. Timer-based setting of notification characteristics is further described below with reference to FIG. 2, and event-based setting of notification characteristics is further described below with reference to FIG. 3.

Typically, the wireless section 104 will include a plurality of remote wireless browsers 120, each of which executes on a different wireless remote computing device. The configuration and other information stored in the information storage area 110 can store service limitations, security limitations, preference information, screen configuration information, and the like, for each of the enhanced remote wireless browsers 120. Each of the different wireless remote computing devices can be uniquely identified to the network gateway 108 by a device identifier.

The following discussion makes use of a ringer device as the notification device. A ringer, or ringer device, as used herein is defined as a device within a wireless computing device (including a wireless communication device) that produces a physical indication to alert a user of an incoming call. The physical indication can, for example, include audio tones or vibrations.

Figure 2:
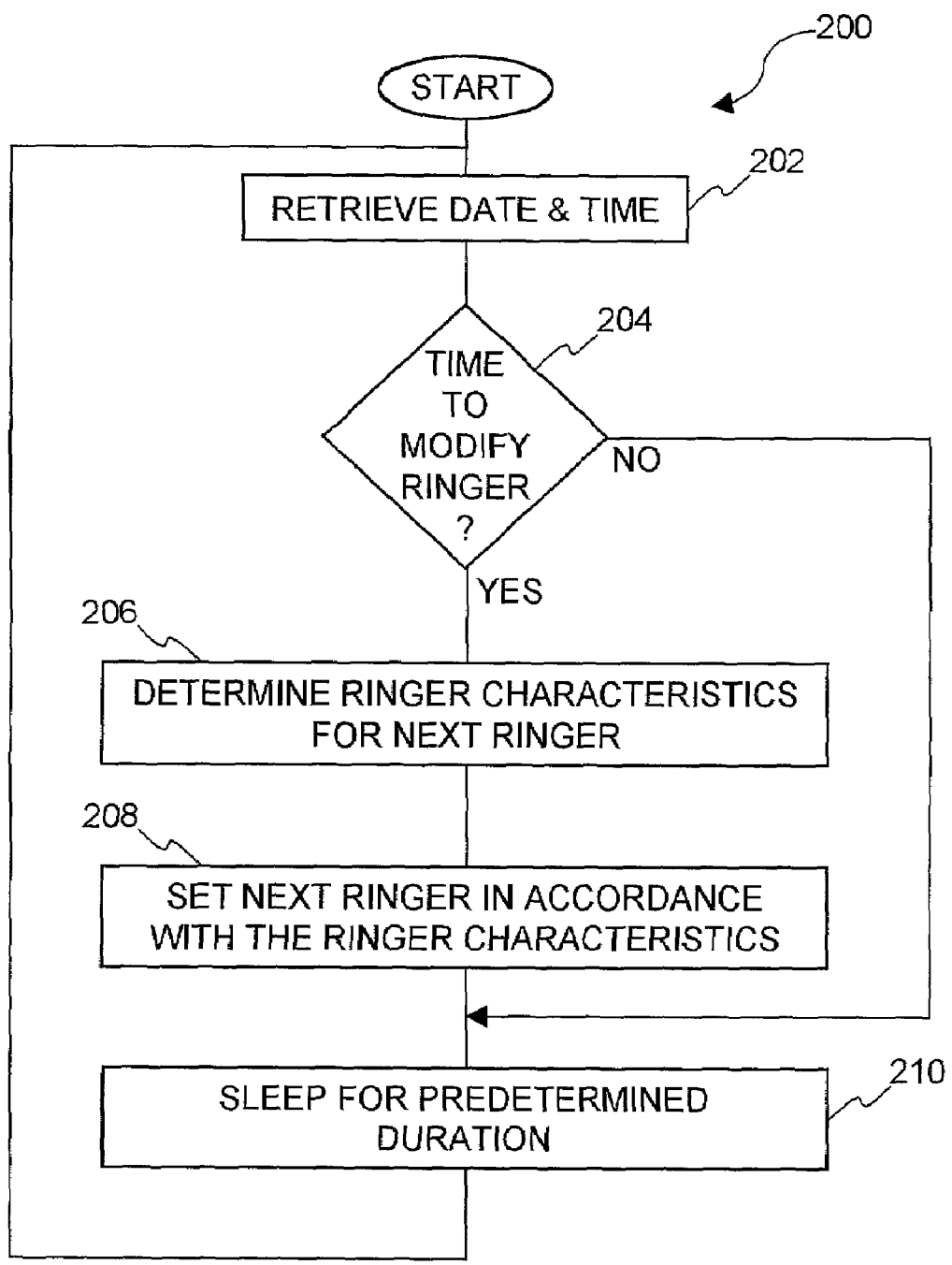
FIG. 2 is a flow diagram of time-based ringer modification processing according to one embodiment of the invention.

FIG. 2 is a flow diagram of time-based ringer modification processing 200 according to one embodiment of the invention. The time-based ringer modification processing 200 is, for example, performed on a mobile device. For example, the time-based ringer modification processing 200 can be performed by the mobile device 116 shown in FIG. 1.

The time-based ringer modification processing 200 initially receives 202 a date and time indication. Typically, the mobile device is aware of the date and time, and thus is able to locally retrieve such information. Alternatively, the date and time can be provided to the mobile device from a remote device, such as a web server, gateway or carrier, via a wireless channel or link.

Next, a decision 204 determines whether it is time to modify the ringer for the mobile device. As noted above, the mobile device includes a notification device, e.g., a ringer, that can be modified or set to various operational states. The decision 204 determines whether the ringer is to be modified, given the date and time that have been retrieved 202. Modification of the ringer can be triggered based on time events in a variety of ways. For example, the decision 204 can be based on a ringer schedule, a profile schedule, or deactivation period. A ringer schedule is a time schedule in which the ringer can take different operational states throughout the schedule based on time. A profile schedule is associated with a user and (directly or indirectly) includes a ringer schedule. Deactivation periods are periods throughout the day or week that a user desires to deactivate the ringer of the mobile device.

In any case, when the decision 204 determines that it is time to modify the ringer, then ringer characteristics for the next ringer are determined 206. Here, the ringer characteristics for the next ringer can be provided by the schedule or deactivation period. The ringer characteristics set the operational characteristics for the next ringer. The next ringer is then set 208 in accordance with the ringer characteristics. At this point, the ringer has been modified in accordance with time-based processing. On the other hand, when the decision 204 determines that it is not time to modify the ringer, then operations 206 and 208 are bypassed. Following the operation 208, as well as following the decision 204 when the ringer is not being modified, the time-based ringer modification processing 200 can optionally sleep 210 for a predetermined duration. Here, although not a necessary operation, by placing the time-based ringer modification processing 200 (software process) to sleep for the predetermined duration (predetermined period), the mobile device is able to conserve processing resources and perhaps power consumption until the time-based ringer modification processing 200 is awakened. As an example, the predetermined duration can be one minute in length, according to one embodiment. However, other embodiments are free to use smaller or larger durations. In any case, once the predetermined duration has expired (i.e., process awakened), the time-based ringer modification processing 200 returns to repeat the operation 202 and subsequent operations so that the time-based ringer modification processing 200 can continue.

Accordingly, the time-based ringer modification processing 200 operates to automatically alter the ringer characteristics. For example, if a ringer schedule specifies that the ringer is to be off from 12 noon to 1 PM then the time-based ringer modification processing 200 operates to turn off the ringer during such a time period. As another example, if a deactivation period is set for 30 minutes, then once requested, the ringer is deactivated and then following a 30 minute duration, the time-based ringer modification processing 200 operates to reactivate the ringer. Of course, ringers often have more controllable features besides on and off, thus any of the ringer characteristics can be modified with this approach. In one implementation, following a duration or schedule period that sets particular ringer characteristics (or a temporary ringer), the ringer can automatically revert back to previous ringer characteristics or default ringer characteristics.

Figure 3:
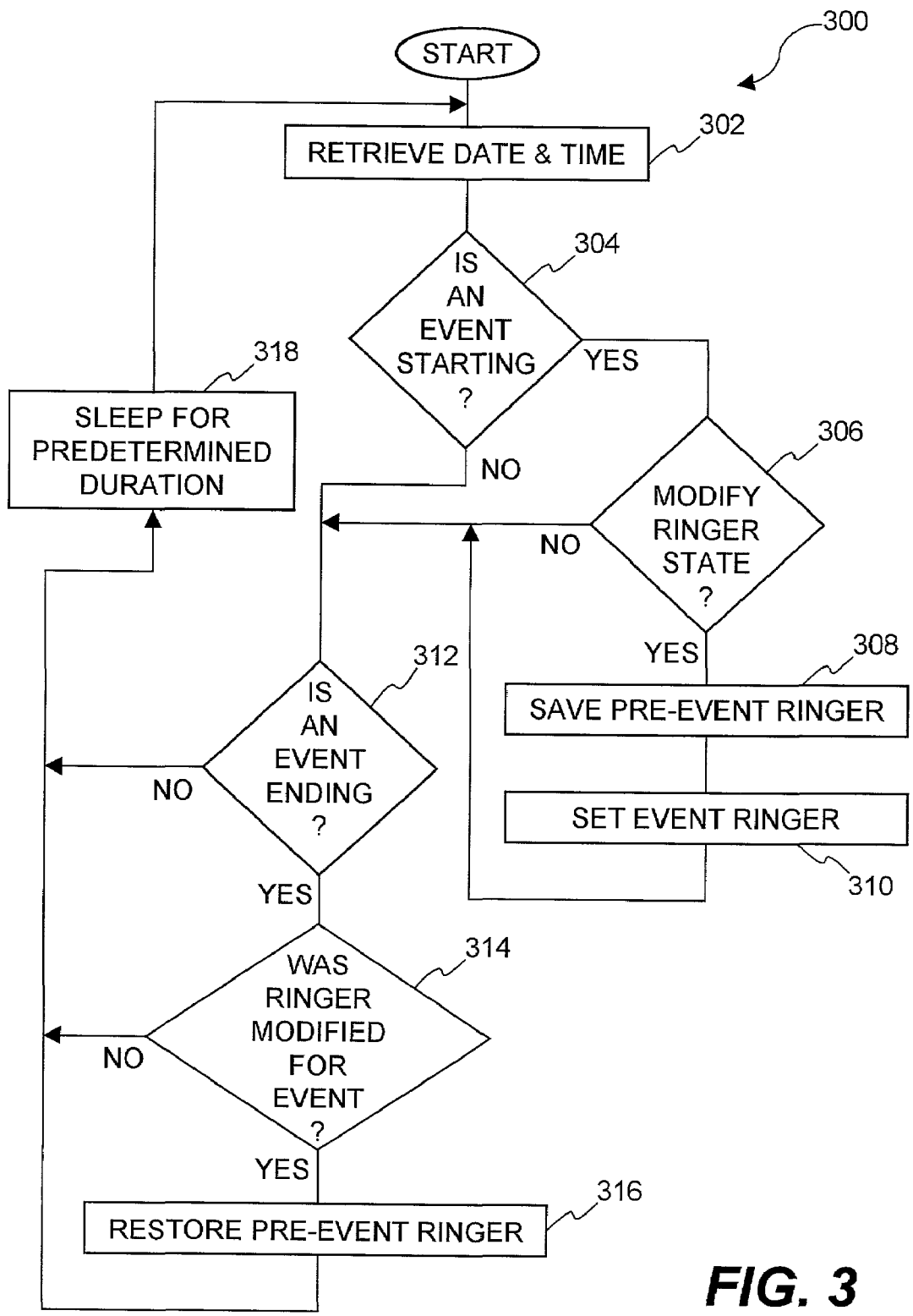
FIG. 3 is a flow diagram of an event-based ringer notification processing according to one embodiment of the invention.

FIG. 3 is a flow diagram of an event-based ringer notification processing 300 according to one embodiment of the invention. The event-based ringer notification processing 300 is, for example, performed on a mobile device. For example, the event-based ringer modification processing 300 can be performed by the mobile device 116 shown in FIG. 1.

The event-based ringer notification processing 300 initially receives 302 a date and time. The date and time being received 302 can reside locally within a mobile device or be received at the mobile device from an external source, such as a web server, a network gateway or carrier, via a wireless carrier or link.

Next, a decision 304 determines whether an event is starting. Here, the mobile device understands when previously calendared events begin (start) and end. For example, a meeting scheduled in a calendar application residing on the mobile device typically begins at a start time and ends at an end time (or after a predetermined duration, e.g., one hour). When the decision 304 determines that an event is starting, then a decision 306 determines whether the ringer state (ringer characteristics) for the mobile device should be modified. Here, the decision 306 determines whether the ringer state should be modified in accordance with the particular event that is now starting. Typically, when events are scheduled, a user would also indicate a desired ringer state during such an event. Hence, when the desired ringer state is not the current ringer state, then the decision 306 would indicate that the ringer state is to be modified. Hence, when the decision 306 determines that the ringer state should be modified, a pre-event ringer is saved 308. Here, the pre-event ringer being saved 308 is the current ringer for the mobile device. By saving the pre-event ringer at this point, the event-based ringer notification processing 300 is later able to return to the pre-event ringer. After the pre-event ringer is saved 308, the event ringer is set 310. Here, the ringer for the mobile device is set to the event ringer that was requested by the user during the event which is just starting. Following the operation 310, the decision 306 when the ringer state is not to be modified, or the decision 304 when an event is not starting, the event-based ringer notification processing 300 determines 312 whether an event is ending.

When the decision 312 determines that an event is ending, a decision 314 determines whether the ringer was previously modified for the event. When the decision 314 determines that the ringer was previously modified for the event, the pre-event ringer is restored 316. Here, the pre-event ringer that was previously saved at operation 308 is now restored so that the ringer returns to the state it had prior to the event which caused the ringer to be modified. Following the operation 316, as well as following either the decision 312 when an event is not ending or the decision 314 when the ringer was not previously modified for the event, the event-based ringer notification processing 300 sleeps 318 for a predetermined duration. The predetermined duration is a period of time for which the event-based ringer notification processing 300 delays or inactivates prior to returning to repeat the operation 302 and subsequent operations. The length of the predetermined duration can vary depending upon implementation. In one embodiment, the predetermined duration is on the order of one minute in length.

Although operations 308 and 316 are included within the event-based ringer notification processing 300, other embodiments of event-based ringer notification processing need not save the pre-event ringer and later restore the pre-event ringer. In other words, the ringer can always be returned to a default ringer following the expiration of an event ringer. Also, the operation 318 is optional for purposes of conserving processing resources and perhaps power consumption. Furthermore, although not typically scheduled in this manner, it is possible that the calendar application could indicate that multiple events are simultaneously occurring, in which case, following the expiration of the event, the event ringer could be maintained until the other concurrent event is completed. Still further, in the case in which there are overlapping events, the ringer could be modified to the least intrusive event ringer requested.

FIGS. 4A–4F are representative screen displays suitable for use with the invention. The representative screen displays pertain to time-based ringer modification (see, e.g., FIG. 2).

Figure 4A:
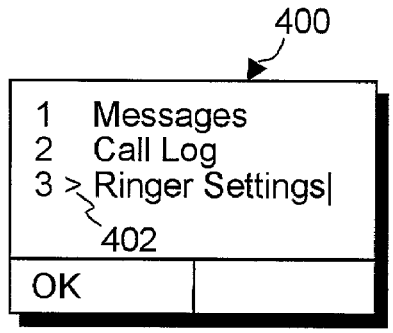
FIGS. 4A–4F are representative screen displays pertaining to timer-based ringer modification suitable for use with the invention.
Figure 4B:
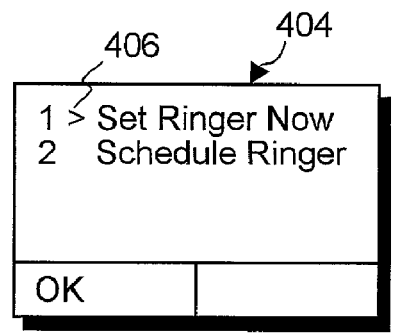
Figure 4C:
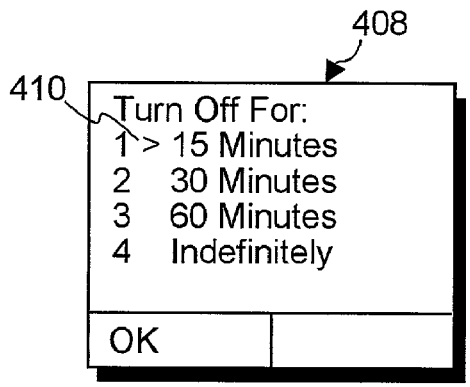
Figure 4D:
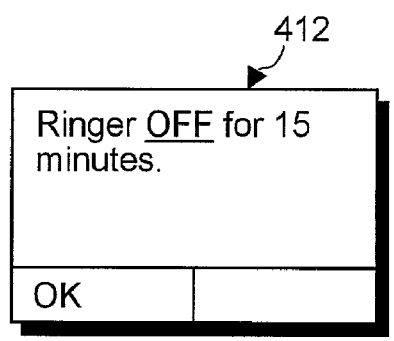

FIG. 4A illustrates a screen display 400 associated with a main menu that allows a user of a mobile device to view messages, view a call log, or view ringer settings. In FIG. 4A, a selection indicator 402 indicates that ringer settings are selected. FIG. 4B illustrates a screen display 404 of a subsequent menu (ringer menu) that allows for ringer settings to be controlled. The screen display 404 illustrated in FIG. 4B follows from the screen display in FIG. 4A given that the ringer setting selection was made. Within the ringer menu illustrated in FIG. 4B, the user can select to set a ringer setting now or can select to schedule a ringer setting later. The setting of the ringer now is a time-based ringer notification based on relative time, whereas the scheduled ringer pertains to a time-based ringer notification based on absolute time. In FIG. 4B, a selection indicator 406 indicates that the ringer is to be set based on relative time. FIG. 4C illustrates a representative screen display 408 displaying a ringer setting menu. The ringer setting menu is utilized to set a ringer to off for a predetermined duration. The ringer setting menu of FIG. 4C includes four options from which the user can select. The four options include (1) setting the ringer to off for 15 minutes, (2) setting the ringer to off for 30 minutes, (3) setting the ringer to off for 60 minutes, or (4) setting the ringer to off indefinitely. As shown in FIG. 4C, a selection indicator 410 indicates that the ringer has been set to off for a 15 minute duration. Then, directly following the screen display shown in FIG. 4C, a screen display 412 shown in FIG. 4D can be displayed to confirm the ringer setting selection or to specify the status of the ringer. As shown in FIG. 4D, the ringer is said to be off for 15 minutes. Alternatively, it should be understood that the various display screens can be made available to the user at any point. For example, the screen display of FIG. 4D could be available for selection from various menus (or selections), thereby allowing the user to easily determine the status of the ringer.

Figure 4E:
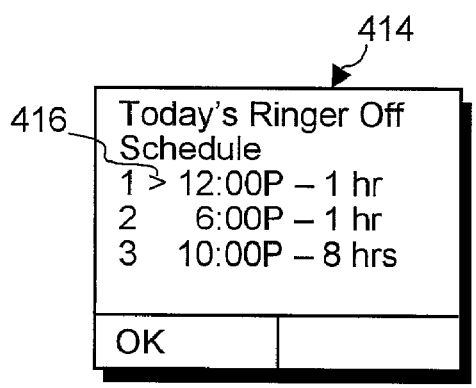

FIG. 4E illustrates a screen display 414 that enables a user to schedule or display a schedule for the ringer. As shown in FIG. 4E, the ringer associated with the mobile device will be (1) off today (the current day) during a one hour interval beginning at 12 PM, (2) off for a one hour interval beginning at 4 PM, and (3) off for eight hours beginning at 10 PM. These ringer-off scheduled time periods can pertain to various activities or events. For example, the user can schedule the ringer to be set to off in accordance with meetings that are to be attended, in accordance with one's time off from work, in accordance with one's lunch hour, or for a variety of other reasons. In FIG. 4E, a selection indicator 416 indicates that the first item of the schedule for the ringer is selected.

Figure 4F:
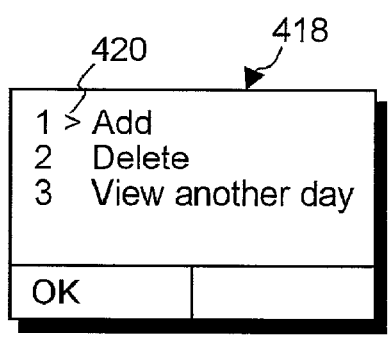

FIG. 4F illustrates a screen display that can be used to enable a user to add, delete or view entries for the ringer schedule, or to allow the user to view a schedule associated with another day. The user is thus able to control the ringer of the mobile device via one or more ringer schedules that the user manages. For example, the ringer could utilize a first schedule for weekdays and a second schedule for weekends. Still further, a first ringer schedule could be associated with Monday, Wednesday and Friday, a second ringer schedule could be associated with Tuesday and Thursday, a third ringer schedule could be associated with Saturday, and a fourth ringer schedule associated with Sunday. Still further, each day of the week could have its own ringer schedule. Hence, the schedules can be associated with a single day or multiple days.

FIGS. 5A–5E are representative screen displays suitable for use with the invention. The representative screen displays pertain to event-based ringer modification (see, e.g., FIG. 3).

Figure 5A:
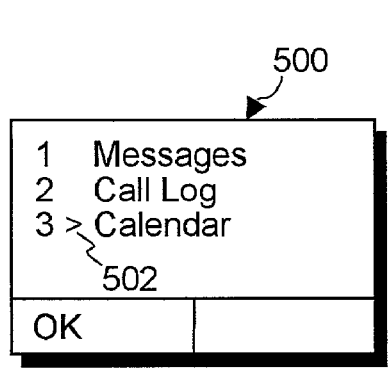
FIGS. 5A–5E are representative screen displays pertaining to event-based ringer modification suitable for use with the invention.
Figure 5B:
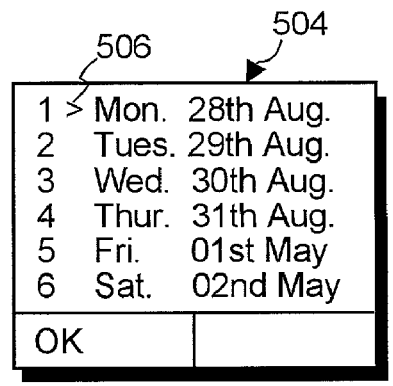
Figure 5C:
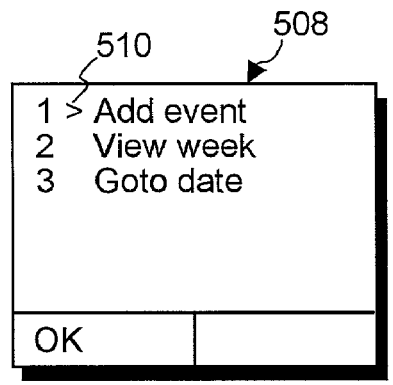
Figure 5D:
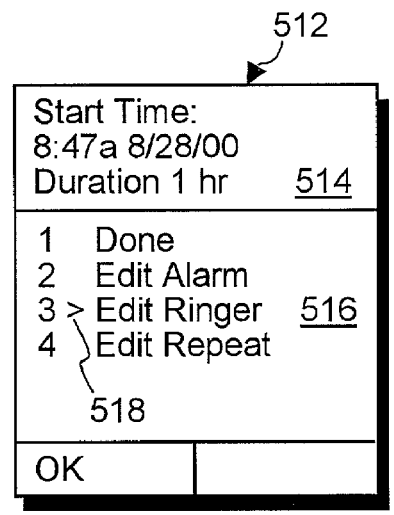
Figure 5E:
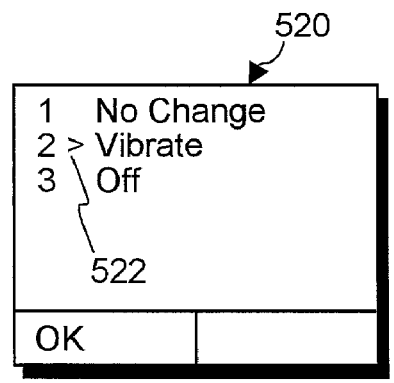

FIG. 5A illustrates a screen display 500 associated with a main menu. The main menu includes a first entry to view messages, a second entry to view a call log, and a third entry for calendar information. As shown in FIG. 5A, the calendar entry is selected by a selection indicator 502. FIG. 5B illustrates a screen display 504 of a subsequent menu (date menu) that allows a user to select a particular date. The screen display 504 illustrated in FIG. 5B follows from the screen display in FIG. 4A, given that the calendar item was selected. From the date menu provided by the screen display 504, the user selects a particular date for which calendar information is to be viewed or modified. In FIG. 5B, a selection indicator 506 indicates that the date of Monday, August 28$^{th}$ has been selected. FIG. 5C illustrates a screen display 508 which contains a menu of calendar actions that can be selected by a user. The calendar actions shown in the screen display 508 of FIG. 5C are (1) add event (2) view week and (3) goto the date. The "add event" item allows the user to add an event to their calendar, as well as allowing them to specify ringer characteristics to be associated with the event. The "view week" item in the calendar action menu allows the user to view a week of their calendar. The "goto date" item in the calendar action menu allows the user to specify a particular date to go to in the calendar. As shown in FIG. 5C, a selection indicator 510 indicates that the "add event" item in the calendar action menu has been selected. FIG. 5D illustrates an event information display screen 512 that might be displayed after an event has been entered using other display screens (such as those associated with a calendar application). The event information display screen 512 includes an event summary portion 514 and an edit menu 516. The event summary information 514 indicates the start time, date and duration of an event that has been added or is present within the calendar associated with the user. The edit menu 516 provides various edit operations that are associated with the adding or viewing of events associated with the calendar. For example, as shown in FIG. 5D, the edit menu 516 includes the following items (1) done, (2) edit alarm, (3) edit ringer (4) edit repeat. As shown in FIG. 5D, a selection indicator 518 indicates that the "edit ringer" item within the edit menu 516 has been selected. The edit ringer item enables a user to edit the ringer to be utilized during the event. In other words, the edit ringer allows the user to define an event ringer that is utilized during the associated event. FIG. 5E illustrates a screen display of a ringer edit menu 520. The ringer edit menu 520 includes various menu items that allow a user to modify or set the characteristics of a ringer to be associated with the event. In the representative edit ringer menu 520 shown in FIG. 5E, the menu items include (1) no change, (2) vibrate and (3) off. As shown in FIG. 5E, a selection indicator 522 indicates that the "vibrate" item within the edit ringer menu 520 has been selected so that the ringer is set to the vibrate mode during the associated event.

The various representative screen displays shown in FIGS. 4A–4F and 5A–5E reflect graphical user interfaces that can be utilized in accordance with another embodiment of the invention.

Figure 6A:
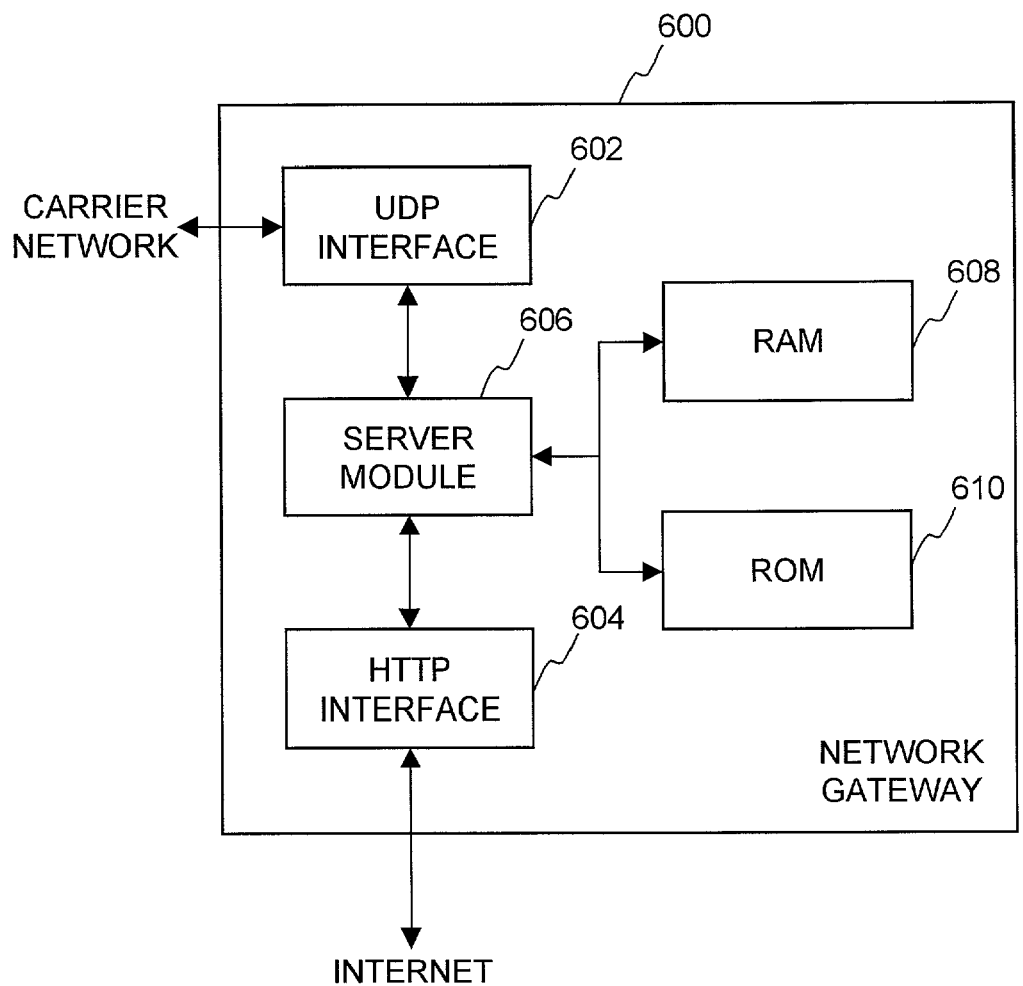
FIG. 6A is a block diagram of a network gateway according to one embodiment of the invention.

FIG. 6A is a block diagram of a network gateway 600 according to one embodiment of the invention. The network gateway 600 can, for example, represent the network gateway 108 illustrated in FIG. 1, which is typically a server computer (server device). To avoid obscuring aspects of the present invention, well known methods, procedures, components, and circuitry in the network gateway 600 are not described in detail.

The network gateway 600 may include a User Datagram Protocol (UDP) interface 602 that couples to the carrier network 214, an HTTP interface 604 that couples to the network 106, and a server module 606 coupled between the UDP interface 602 and the HTTP interface 604. The server module 606 performs traditional server processing, as well as (if needed) protocol conversion processing. In particular, the protocol conversion processing includes protocol conversion between UDP and HTTP. Further, to assist the server module 606 in its processing, the network gateway 600 includes a random access memory (RAM) 608 and a read-only memory (ROM) 610. Among other things, the RAM 608 can store device identifiers, subscriber identifiers, configuration information and other data. In one embodiment, such information is stored in the RAM 608 as a database. Also, RAM 608 can represent the information storage area 110 illustrated in FIG. 1.

Figure 6B:
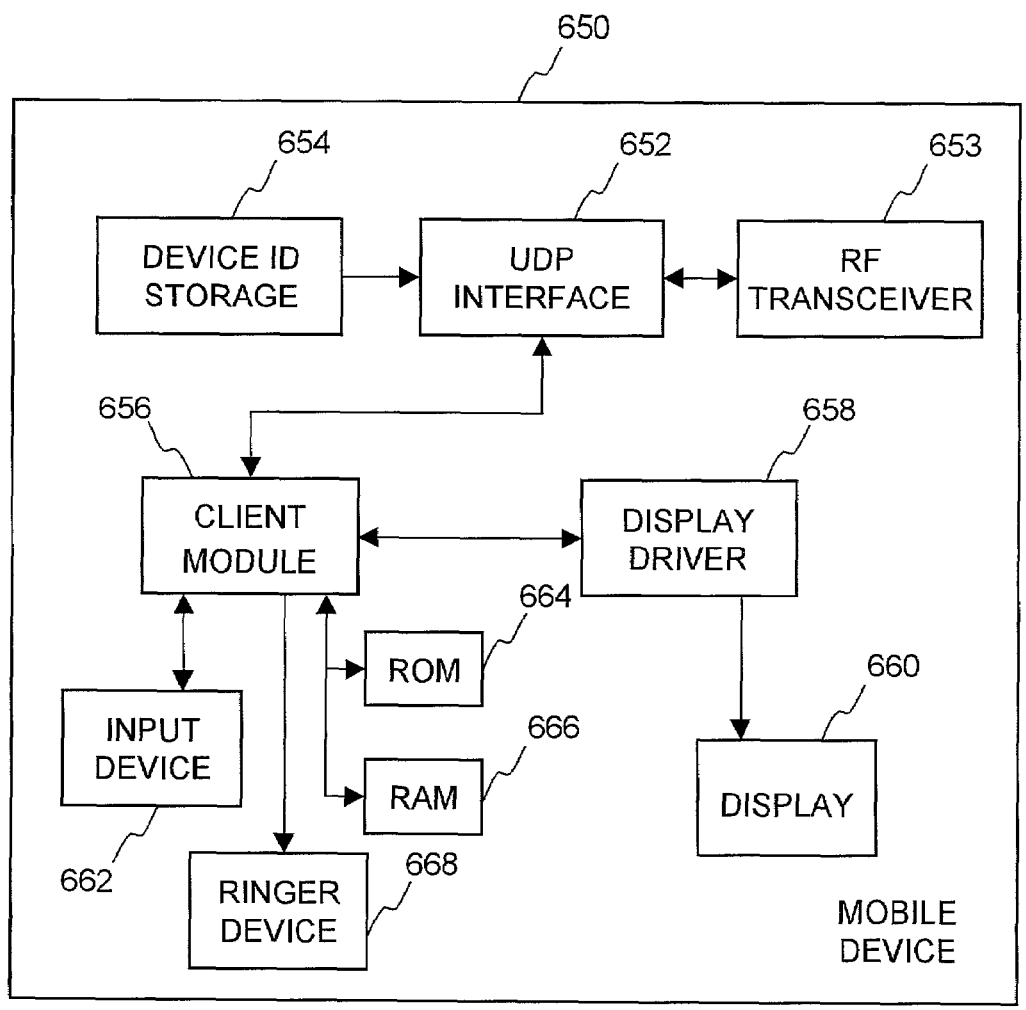
FIG. 6B is a block diagram of a mobile device according to one embodiment of the invention.

FIG. 6B is a block diagram of a mobile device 650 according to one embodiment of the invention. The mobile device 650 can, for example, correspond to the remote wireless computing device 116 that operates the remote wireless browser 120 illustrated in FIG. 1. The mobile device 650 may include a UDP interface 652 that couples to the carrier network 214 via a RF transceiver 653 to receive incoming and outgoing signals. A device identifier (ID) storage 654 supplies a device ID to the UDP interface 652. The device ID identifies a specific code that is associated with a particular mobile device 650. In addition, the mobile device 650 includes a client module 656 that performs many of the processing tasks performed by the mobile device 650, including establishing a communication session with the carrier network 114 and the network gateway 108, requesting and receiving data (e.g., pages, decks of cards) from the network 106, displaying information on a display of the remote computing device, and receiving user input. The client module 656 is coupled to the UDP interface 652 for the establishment of a communication session and the requesting and receiving of data. The client module 656 also couples to a display driver 658 that drives an addressable display 660 having selectable address locations capable of displaying user interface components. The client module 656 controls the display driver 658 to display information on the display 660 to the user. Additionally, the client module 656 is coupled to an input device 662, a ROM 664, and a RAM 666. Preferably, among other things, the client module 656 operates a network browser, such as a Handheld Device Markup Language (HDML) web browser or a Wireless Markup language (WML) web browser. Still further, the client module 656 operates to provide control of notification characteristics (e.g., timer-based or event-based ringer notification processing) and, if supported, a calendar application. The client module 656 can interact with a ringer device 668 to provide notification to a user in accordance with particular notification characteristics. In one embodiment, the client module 656 implements the notification unit 126 of FIG. 1. The input device 662 allows a user of the mobile device 650 to input data and thus make selections in controlling and using the mobile device 650. The ROM 664 stores predetermined data and processing instructions for the client module 656. The RAM 666 is used to provide temporary data storage for incoming and outgoing data being received and transmitted. The RAM 666 can also be used to provide storage for previously entered notification (ringer) information.

Although the embodiments of the network gateway 600 and the mobile device 650 described in FIGS. 6A and 6B are depicted as using UDP and HTTP protocols, it should be recognized that other protocols and other protocol stacks can be provided and utilized. Additional details on the design and construction of the network gateway 600 and the mobile device 650 are contained in U.S. Pat. No. 5,809,415 entitled "METHOD AND ARCHITECTURE FOR AN INTERACTIVE TWO-WAY DATA COMMUNICATION NETWORK," which is hereby incorporated by reference.

The invention is preferably implemented in software, but can be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network coupled computer systems so that the computer readable code is stored and executed in a distributed fashion.

The advantages of the invention are numerous. Different embodiments or implementations may yield one or more of the following advantages. One advantage of the invention is that mobile devices can control notifications to users in more intelligent, automated ways. Another advantage of the invention is that users of mobile devices can manage notifications more easily.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for automatically switching notification characteristics for a mobile communication device, said method comprising:

obtaining a time indication;

determining whether an event is starting, the event having an event start time and an event end time, said determining includes at least comparing the time indication with an event start time, the event having at least one notification characteristic associated therewith;

determining whether at least one of the notification characteristics for the mobile communication device are to be modified based on whether the event is starting and whether the at least one notification characteristic associated with the event is different from a pre-event notification characteristic at the time prior to the start of the event; and modifying the at least one of the notification characteristics and saving the pre-event notification characteristic when it is determined that at least one of the notification characteristics are to be modified.

2. A computer-implemented method as recited in claim 1, wherein the notification characteristics include at least one of volume and type.

3. A computer-implemented method as recited in claim 2, wherein the type is one of audible or vibration.

4. A computer-implemented method as recited in claim 1, wherein said determining whether an event is starting comprises:

comparing the time indication to timing information within a schedule, and wherein the notification characteristics associated with the event are indicated by the schedule.

5. A computer-implemented method as recited in claim 4, wherein the schedule is a notification schedule.

6. A computer-implemented method as recited in claim 4, wherein the schedule is a profile schedule.

7. A computer-implemented method as recited in claim 1, wherein said determining whether the event has ended comprises:

comparing the time indication to a deactivation period.

8. A computer-implemented method as recited in claim 7, wherein the deactivation period is determined by the user of the mobile communication device.

9. A computer-implemented method as recited in clam 1, wherein the mobile communication device is one of a mobile telephone, a pager and a Personal Digital Assistant.

10. A computer-implemented method as recited in clam 1, wherein said method further comprises:

determining whether the event has ended; and restoring the at least one of the notification characteristics to the pre-event notification characteristics when it is determined that the event has ended.

11. A computer-implemented method for automatically controlling notification characteristics for a mobile communication device based on events produced by a calendar application, said computer-implemented method comprising:

obtaining a date and time indication;

determining, from the calendar application, whether an event is starting or ending at a time of the date and time indication;

modifying at least one of the notification characteristics for the mobile communication device based on notification criteria associated with the event when said determining determines that the event is starting and saving the notification characteristics at the time prior to the start of the event as pre-event notification characteristics; and restoring at least one of the notification characteristics for the mobile communication device based on the pre-event notification characteristics when said determining determines that the event has ended.

12. A computer-implemented method as recited in claim 11, wherein the notification characteristics for the mobile communication device pertain to a ringer.

13. A computer-implemented method as recited in claim 11, wherein the at least one of the notification characteristics being modified by said modifying include at least one of ringer type and volume level.

14. A computer-implemented method as recited in claim 11, wherein said computer-implemented method further comprises:

repeating said obtaining, said deter whether an event is starting, said determining whether the notification characteristics are to be modified, said modifying, said determining whether the event has ended and said restoring.

15. A computer-implemented method as recited in claim 11, wherein events have different event types, and wherein the at least one notification characteristics associated with the event are indicated by the event type associated therewith.

16. A computer-implemented method as recited in claim 11, wherein more than one type of event is used and different types of events receive different notification characteristics.

17. A computer-implemented method as recited in claim 11, wherein a user assigns the at least one notification characteristics, event start time and event end time for the event.

18. A computer-implemented method as recited in claim 14, wherein the automatic switching notification process is in sleep mode between the event end time and the event start time of consecutive events.

19. A computer-implemented method as recited in claim 18, wherein the duration of the sleep mode is predetermined duration of approximately one minute.

* * * * *